US012217714B2

(12) United States Patent
Dong

(10) Patent No.: US 12,217,714 B2
(45) Date of Patent: Feb. 4, 2025

(54) IMAGE DISPLAY METHOD AND SYSTEM, DISPLAY DEVICE, HEAD-MOUNTED DISPLAY DEVICE AND MEDIUM

(71) Applicant: GOERTEK INC., Shandong (CN)

(72) Inventor: Meng Dong, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/579,019

(22) PCT Filed: Dec. 15, 2021

(86) PCT No.: PCT/CN2021/138131
§ 371 (c)(1),
(2) Date: Jan. 12, 2024

(87) PCT Pub. No.: WO2023/050588
PCT Pub. Date: Apr. 6, 2023

(65) Prior Publication Data

US 2024/0321228 A1 Sep. 26, 2024

(30) Foreign Application Priority Data

Sep. 28, 2021 (CN) .......................... 202111148769.4

(51) Int. Cl.
*G09G 3/36* (2006.01)

(52) U.S. Cl.
CPC ... *G09G 3/3607* (2013.01); *G09G 2320/0252* (2013.01)

(58) Field of Classification Search
CPC ..................... G09G 2320/0252; G09G 3/3607
See application file for complete search history.

(56) References Cited

U.S. PATENT DOCUMENTS

2005/0140626 A1 6/2005 Doyen et al.
2007/0035492 A1 2/2007 Chang
(Continued)

FOREIGN PATENT DOCUMENTS

CN 1542714 A 11/2004
CN 101256289 A 9/2008
(Continued)

OTHER PUBLICATIONS

International Search Report from International Application No. PCT/CN2021/138131 mailed Mar. 30, 2022.

*Primary Examiner* — Van N Chow
(74) *Attorney, Agent, or Firm* — Shih IP Law Group, PLLC

(57) ABSTRACT

Disclosed in some embodiments are an image display method and system, a display device, a head-mounted display device, and a medium. The method includes: comparing grayscale values of pixel points of a current image with grayscale values of pixel points of a preset grayscale image to obtain first comparison results, and comparing grayscale values of pixel points of the next frame of image of the current image with the grayscale values of the pixel points of the preset grayscale image to obtain second comparison results; comparing the first comparison result and the second comparison result corresponding to the pixel points at the same position to obtain a pixel point needing to be adjusted; and when the display of the current image is completed, flipping a liquid crystal at the pixel point needing to be adjusted, such that the pixel point needing to be adjusted reaches a target grayscale value.

11 Claims, 5 Drawing Sheets

(56) References Cited

U.S. PATENT DOCUMENTS

| | | | | |
|---|---|---|---|---|
| 2007/0182687 | A1* | 8/2007 | Kim | H04N 5/145<br>345/98 |
| 2010/0165222 | A1* | 7/2010 | Choi | H04N 13/341<br>345/87 |
| 2013/0094754 | A1* | 4/2013 | Lee | G09G 3/36<br>382/167 |
| 2014/0043376 | A1* | 2/2014 | Zhang | G09G 3/3607<br>345/89 |
| 2016/0125786 | A1* | 5/2016 | Lai | G09G 3/36<br>345/691 |
| 2020/0126497 | A1* | 4/2020 | Wang | G09G 5/10 |

FOREIGN PATENT DOCUMENTS

| | | | |
|---|---|---|---|
| CN | 102821294 | A | 12/2012 |
| CN | 104916246 | A | 9/2015 |
| CN | 106920531 | A | 7/2017 |
| CN | 108417184 | A | 8/2018 |
| CN | 109671412 | A | 4/2019 |
| CN | 111966318 | A | 11/2020 |
| CN | 112542142 | A | 3/2021 |
| CN | 113035149 | A | 6/2021 |
| WO | 2019127718 | A1 | 7/2019 |

* cited by examiner

IMAGE DISPLAY METHOD AND SYSTEM, DISPLAY DEVICE, HEAD-MOUNTED DISPLAY DEVICE AND MEDIUM

The disclosure claims a priority to a Chinese Patent Application No. 202111148769.4, entitled "IMAGE DISPLAY METHOD AND SYSTEM, DISPLAY DEVICE, HEAD-MOUNTED DISPLAY DEVICE AND MEDIUM", filed with the China Patent Office on Sep. 28, 2021, the entire contents of which are incorporated into the disclosure by reference.

TECHNICAL FIELD

The disclosure relates to a technical field of image display, and more particularly, to an image display method and system, a display device, a head-mounted display device and a medium.

BACKGROUND

A virtual reality (VR) device may make an image of a scene seen by a user more realistic, and provide the user with an immersive experience. For the conventional VR device, during switch of images, there is a large difference between a grayscale value of a current frame image and a grayscale value of a next frame image. Thus, when the liquid crystal flips, a flipping angle of a liquid crystal is so large that the flip of the liquid crystal takes a long time, resulting in unsmooth display of the image.

SUMMARY

An embodiment of the present disclosure provides an image display method and system, a display device, a head-mounted display device and a medium, for solving the technical problem that, in the conventional VR device, during the switch of the images, there is a large difference between the grayscale value of the current frame image and the grayscale value of the next frame image, such that the flip of the liquid crystal takes a long time, resulting in unsmooth display of the image.

An embodiment of the present disclosure provides an image display method, applied to a display device, wherein the image display method includes:

- comparing grayscale values of pixels of a current image and a preset grayscale image to obtain first comparison results, and comparing grayscale values of pixels of a second image and the preset grayscale image to obtain second comparison results, wherein the second image is a next frame image of the current image;
- comparing the first comparison results and the second comparison results corresponding to the pixels at the same positions to obtain a pixel needed to be adjusted; and
- flipping a liquid crystal at the pixel needed to be adjusted when display of the current image is completed, such that the pixel needed to be adjusted reaches a target grayscale value.

In an embodiment, the first comparison results are differences between the grayscale values of the pixels of the current image and the preset grayscale image, and the second comparison results are differences between the grayscale values of the pixels of the second image and the preset grayscale image, and

- comparing the first comparison results and the second comparison results corresponding to the pixels at the same positions to obtain the pixel needed to be adjusted includes:
- obtaining symbols of the first comparison results and the second comparison results corresponding to the pixels at the same positions;
- obtaining a pixel at the same positions corresponding to the first comparison results and the second comparison results with different symbols; and
- determining the pixel at the same positions corresponding to the first comparison results and the second comparison results with different symbols as the pixel needed to be adjusted.

In an embodiment, comparing the first comparison results and the second comparison results corresponding to the pixels at the same positions to obtain the pixel needed to be adjusted further includes:

- summing up absolute values of the first comparison results and the second comparison results with different symbols to obtain an absolute difference, and if the absolute difference is greater than a preset difference, determining the corresponding pixel at the same positions as the pixel needed to be adjusted.

In an embodiment, the target grayscale value is the same as the grayscale value of the preset grayscale image.

In an embodiment, the image display method, after flipping the liquid crystal at the pixel needed to be adjusted when display of the current image is completed, such that the pixel needed to be adjusted reaches the target grayscale value, further includes:

- when a writing time is reached, transmitting data of the pixels corresponding to the second image to a display screen to display the second image when the display screen is lit.

In an embodiment, the image display method, after when the writing time is reached, transmitting the data of the pixels corresponding to the second image to the display screen to display the second image when the display screen is lit, further includes:

- updating the first comparison results according to the second comparison results;
- obtaining a third image, and updating the second comparison results according to the third image and the preset grayscale image, wherein the third image is a next frame image of the second image; and
- returning to perform comparing the grayscale values of the pixels of the current image and the preset grayscale image to obtain the first comparison results, and comparing the grayscale values of the pixels of the second image and the preset grayscale image to obtain the second comparison results.

Further, in order to achieve the above object, the present disclosure also provides an image display system including:

- a first comparison module for comparing grayscale values of pixels of a current image and a preset grayscale image to obtain first comparison results, and comparing grayscale values of pixels of a second image and the preset grayscale image to obtain second comparison results, wherein the second image is a next frame image of the current image;
- a second comparison module for comparing first comparison results and the second comparison results corresponding to the pixels at the same positions to obtain a pixel needed to be adjusted; and
- a liquid crystal flipping module for flipping a liquid crystal at the pixel needed to be adjusted when display of the current image is completed, such that the pixel needed to be adjusted reaches a target grayscale value.

Further, in order to achieve the above object, the present disclosure also provides a display device including a memory, a processor and an image display program stored on the memory and operable on the processor, wherein when the image display program is executed by the processor, steps of the above image display method are achieved.

Further, in order to achieve the above object, the present disclosure also provides a head-mounted display device including the image display system or the display device.

Further, in order to achieve the above object, the present disclosure also provides a storage medium on which an image display program is stored, wherein when the image display program is executed by a processor, steps of the above image display method are achieved.

The technical solutions of the image display method, the system, the display device, the head-mounted display device and the medium provided in the embodiment of the present disclosure at least have following technical effects or advantages:

The present disclosure adopts the following technical solutions: comparing grayscale values of pixels of a current image and a preset grayscale image to obtain first comparison results, and comparing grayscale values of pixels of a second image and the preset grayscale image to obtain second comparison results; comparing the first comparison results and the second comparison results corresponding to the pixels at the same positions to obtain a pixel needed to be adjusted; and flipping a liquid crystal at the pixel needed to be adjusted when display of the current image is completed, such that the pixel needed to be adjusted reaches a target grayscale value. Thus, the present disclosure solves the technical problem that, in the conventional VR device, during the switch of the images, there is a large difference between the grayscale value of the current frame image and the grayscale value of the next frame image, such that the flip of the liquid crystal takes a long time, resulting in unsmooth display of the image, and achieves technical effects of reducing a flipping angle and a flipping time of the liquid crystal during the switch of the images and accelerating a flipping speed of the liquid crystal, which is advantageous to improve the smooth of the image display.

BRIEF DESCRIPTION OF DRAWINGS

In order to more clearly illustrate the technical solutions in the embodiments of the disclosure or the prior art, the drawings required to be used for the content of the embodiments or the prior art will be briefly introduced in the following. Obviously, the drawings in the following description are merely some embodiments of the disclosure, and for those of ordinary skill in the art, other drawings can also be obtained from the provided drawings without any creative effort.

DETAILED DESCRIPTIONS

Figure 1:
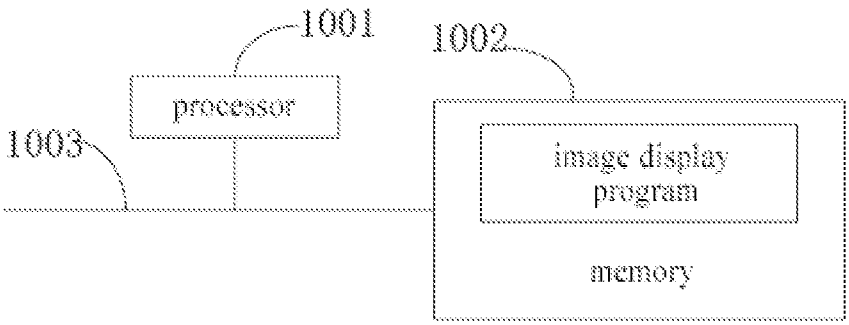
FIG. 1 is a structural diagram of a hardware operating environment related to solutions of embodiments of the present disclosure.

Technical solutions in embodiments of the disclosure will be described below with reference to the drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative efforts shall fall within the protection scope of the present disclosure.

In order to better understanding the above technical solutions, exemplary embodiments of the present disclosure will be described in more detail below with reference to the drawings. Although exemplary embodiments of the present disclosure are shown in the drawings, it should be understood that the present disclosure may be implemented in various forms and should not be limited by the embodiments set forth herein. Rather, these embodiments are provided to enable a more thorough understanding of the present disclosure and to enable a complete communication of the scope of the present disclosure to those skilled in the art.

As shown in FIG. 1, FIG. 1 is a structural diagram of a hardware operating environment related to solutions of embodiments of the present disclosure.

It should be noted that FIG. 1 may be a structural diagram of a hardware operating environment of the display device.

As an implementation method, as shown in FIG. 1, the solution of the embodiment of the present disclosure relates to a display device, which includes a processor 1001, such as a CPU, a memory 1002 and a communication bus 1003. Among them, the communication bus 1003 is used to realize connection communication between these components.

The memory 1002 may be a high-speed RAX memory or non-volatile memory, such as magnetic disk memory. As shown in FIG. 1, the memory 1002 as a storage medium may include an image display program, and the processor 1001 may be configured to call the image display program stored in the memory 1002 and may perform the following operations:

Comparing grayscale values of pixels of a current image and a preset grayscale image to obtain first comparison results, and comparing grayscale values of pixels of a second image and the preset grayscale image to obtain second comparison results, wherein the second image is a next frame image of the current image;

Comparing the first comparison results and the second comparison results corresponding to the pixels at the same positions to obtain a pixel needed to be adjusted; and Flipping a liquid crystal at the pixel needed to be adjusted when display of the current image is completed, such that the pixel needed to be adjusted reaches a target grayscale value.

Further, the processor 1001 may be configured to call the image display program stored in the memory 1002 and may perform the following operations:

Obtaining symbols of the first comparison results and the second comparison results corresponding to the pixels at the same positions;

Obtaining a pixel at the same positions corresponding to the first comparison results and the second comparison results with different symbols; and Determining the pixel at the same positions corresponding to the first comparison results and the second comparison results with different symbols as the pixel needed to be adjusted.

Further, the processor 1001 may be configured to call the image display program stored in the memory 1002 and may perform the following operations:

Summing up absolute values of the first comparison results and the second comparison results with different symbols to obtain an absolute difference, and if the absolute difference is greater than a preset difference, determining the corresponding pixel at the same positions as the pixel needed to be adjusted.

Further, the processor 1001 may be configured to call the image display program stored in the memory 1002 and may perform the following operations:

When a writing time is reached, transmitting data of the pixels corresponding to the second image to a display screen to display the second image when the display screen is lit.

Further, the processor 1001 may be configured to call the image display program stored in the memory 1002 and may perform the following operations:

Updating the first comparison results according to the second comparison results;

Obtaining a third image, and updating the second comparison results according to the third image and the preset grayscale image, wherein the third image is a next frame image of the second image; and Returning to perform comparing the grayscale values of the pixels of the current image and the preset grayscale image to obtain the first comparison results, and comparing the grayscale values of the pixels of the second image and the preset grayscale image to obtain the second comparison results.

The embodiment of the present disclosure provides an embodiment of an image display method, and it needs to be noted that although a logical sequence is shown in the flow chart, in some cases, steps shown or described may be performed in an order different from the logical sequence herein, and the image display method is applied to a display device.

Figure 2:
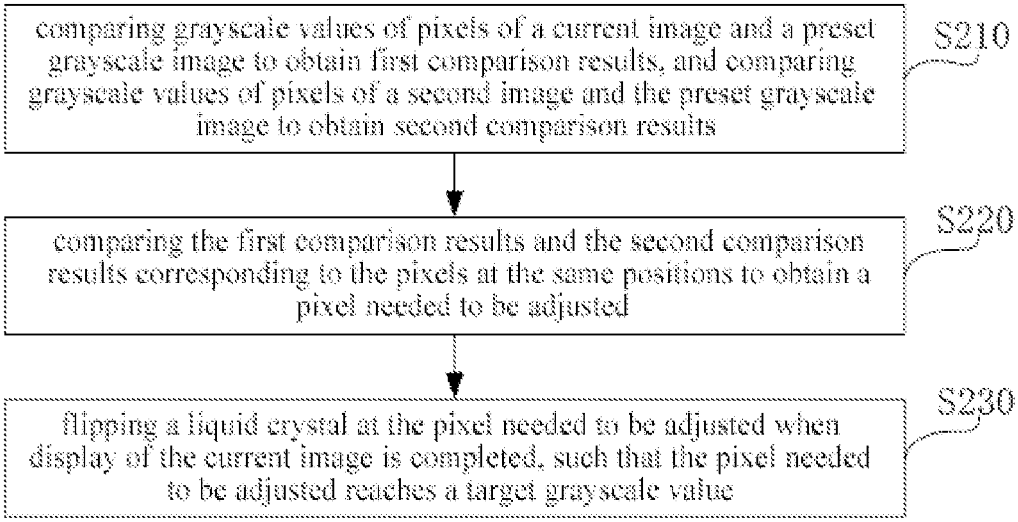
FIG. 2 is a flow diagram of a first embodiment of an image display method of the present disclosure.

As shown in FIG. 2, in a first embodiment of the present disclosure, the image display method of the present disclosure includes following steps:

Step S210: comparing grayscale values of pixels of a current image and a preset grayscale image to obtain first comparison results, and comparing grayscale values of pixels of a second image and the preset grayscale image to obtain second comparison results.

According to a display principle of a display screen, when display of the current image is completed, it is switched to display the next frame image, and the display screen should be controlled to enter into a black insertion phase, which may be understood as turning off a backlight of the display screen for a certain period of time. As the time of the black insertion phase is very short, the human eye cannot sense it when watching the image displayed on the display screen. During the black insertion phase, firstly it will wait for a certain amount of time, and then rendering the next frame image is performed. That is, during the black insertion phase, firstly it will wait for a certain amount of time, and then the pixel data of the next frame image is written into the frame cache when the writing time of the pixel data is reached. After the pixel data of the next frame is written into the frame cache, the pixel data in the frame cache is transmitted into the display screen, and thus when the black insertion phase is over, that is, when the backlight of the display screen is lit, the next frame image is displayed. For example, if a first frame image is currently displayed, rendering a second frame image may be performed during the black insertion phase, and the second frame image may be displayed when the backlight of the display screen is lit. Here, the user of the frame cache stores the pixel data of the rendered image.

In the present embodiment, two caches are pre-set for storing the differences between the grayscale values of the pixels of the image to be displayed on the display screen and the preset grayscale image, and they are represented as a first cache and a second cache respectively. In order to facilitate understanding, in the present disclosure, the frame cache is represented as a third cache. Among them, the first cache stores first comparison results, which are the differences between the grayscale values of the pixels of the current image and the preset grayscale image, the second cache stores the second comparison results, which are differences between the grayscale values of the pixels of a next frame image of the current image and the preset grayscale image. Similarly, in order to facilitate understanding, the current image is represented as the first image, and the next frame image of the current image is represented as the second image.

The first comparison results are written into the first cache before the first image is displayed. The grayscale value may be understood as a RGB component, and the first comparison results may be understood as the differences between the RGB component of the pixels of the first image and the RGB component of the pixels of the preset grayscale image. For example, the RGB component of one pixel A in the first image is (123, 150, 110), the RGB component of each pixel in the preset grayscale image is (127, 127, 127), and the RGB component of the pixel A in the preset grayscale image is also (127, 127, 127). Then, after subtracting the RGB component of the pixel A in the preset grayscale image from the RGB component of the pixel A in the first image, the difference between the RGB component of the pixel A in the first image and the RGB component of the pixel A in the preset grayscale image is (−4, 23, −17).

Further, the second image is generated while the first image is displayed, and the differences between the grayscale values of the pixels of the second image and the preset grayscale image are calculated so as to obtain the second comparison results, and then the second comparison results are written into the second cache. The second comparison results may be understood as the differences between the RGB component of the pixels of the second image and the RGB component of the pixels of the preset grayscale image. For example, the RGB component of one pixel A in the second image is (128, 150, 130), and the RGB component of the pixel A in the preset grayscale image is also (127, 127, 127). Then, after subtracting the RGB component of the pixel A in the preset grayscale image from the RGB component of the pixel A in the second image, the difference between the RGB component of the pixel A in the second image and the RGB component of the pixel A in the preset grayscale image is (1, 23, 3).

Specifically, as the first comparison results have been written into the first cache before the first image is displayed, the first comparison result in the first cache may be obtained when the display screen is detected to be lit (that is, the display screen is displaying the image). Further, as the second image is generated while the display screen displays the first image, and then the calculated second comparison results are written into the second cache, the second comparison results in the second cache may also be obtained when the display screen is detected to be lit, accordingly.

Step S220: comparing the first comparison results and the second comparison results corresponding to the pixels at the same positions to obtain a pixel needed to be adjusted.

In the present embodiment, after obtaining the first comparison results and the second comparison results, the pixel needed to be adjusted in the first image may be obtained by comparing the first comparison results and the second comparison results corresponding to the pixels at the same positions of the first image and the second image. Here, by comparing the first comparison results and the second comparison results corresponding to the pixels at the same positions in the first image and the second image, it may be determined which pixels in the first image needed to be adjusted and which are not needed to be adjusted.

After the pixel needed to be adjusted in the first image is obtained, the target grayscale value corresponding to the pixel needed to be adjusted is calculated according to the first comparison result and the RGB component of the pixel needed to be adjusted. The target grayscale value corresponding to the pixel needed to be adjusted may be understood as the RGB component corresponding to the pixel needed to be adjusted, including at least one of a R component, a G component or a B component. Wherein, the target grayscale value is consistent with each grayscale value of the pixels in the preset grayscale image, that is, the target grayscale value is (127, 127, 127), and the grayscale value of each pixel in the preset grayscale image is also (127, 127, 127).

Figure 3:
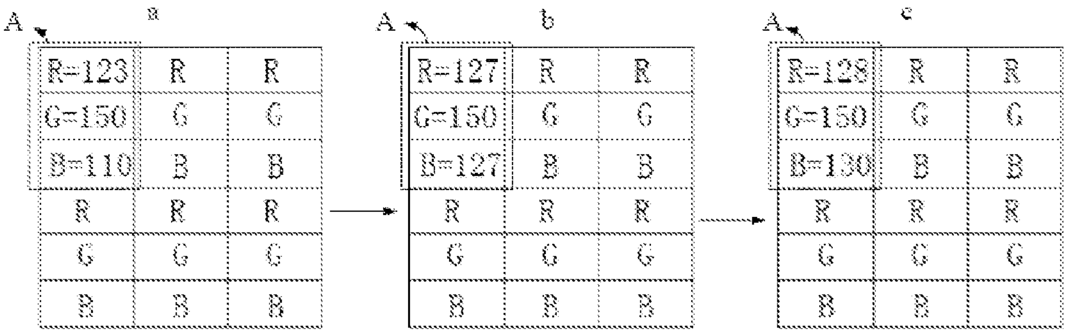
FIG. 3 is a simple schematic diagram of a flipping of a liquid crystal of the present disclosure.

As shown in FIG. 3, a represents the first image, and A represents the pixel A in the first image. By comparing the first comparison results and the second comparison results corresponding to the pixels at the same positions in the first image and the second image, it is determined that pixel A is the pixel needed to be adjusted, so it is required to adjust the R component and the B component in the RGB component of the pixel A. It is known that the RGB component of the pixel A in the first image is (123,150,110), and after calculation, the first comparison result is (−4, 23, −17). Then, both the R component and the B component of the RGB component of the pixel A are adjusted to 127, that is, R=127, B=127. Thus, the target grayscale value corresponding to the pixel A needed to be adjusted is obtained, and the target grayscale value includes R=127 and B=127.

Step S230: flipping a liquid crystal at the pixel needed to be adjusted when display of the current image is completed, such that the pixel needed to be adjusted reaches a target grayscale value.

When display of the image is completed, the target grayscale value corresponding to the pixel needed to be adjusted is transmitted into the display screen to flip the liquid crystal.

In the present embodiment, when display of the first image is completed, the backlight of the display screen is turned off and the black insertion phase is entered. During the waiting time in the black insertion phase, the target grayscale value corresponding to the pixel needed to be adjusted is transmitted into the display screen, and the liquid crystal at the position of the pixel needed to be adjusted is flipped according to the target grayscale value. After the liquid crystal is flipped, the grayscale value of the pixel needed to be adjusted becomes the target grayscale value. As shown in FIG. 3, b represents the corresponding image after the liquid crystal is flipped, and b may be understood as an intermediate image, which is generated during the black insertion phase and cannot be seen by human eyes. Since the pixel A in the first image is the pixel needed to be adjusted, and the target grayscale value corresponding to the pixel A includes R=127 and B=127, the liquid crystal at positions corresponding to R=123 and B=110 in the pixel A in the first image is flipped on the basis of R=123 and B=110 in the pixel A in the first image when the liquid crystal is flipped. The liquid crystal at the positions corresponding to the G component of the pixel A and the RGB component of other pixels in the first image are not flipped, and the result after flipping is shown as b in FIG. 3. In the pixel A in b, R=127, G=150, B=127, and the RGB components of other pixels are not changed.

In the present embodiment, when displaying the first image, the first comparison results of the grayscale values of the pixels between the current image and the preset grayscale image and the second comparison results of the grayscale values of the pixels between the next frame image of the current image and the preset gray image are obtained, so as to determine the pixel needed to be adjusted according to the first comparison results and the second comparison results, and then it is determined the target grayscale value corresponding to the pixel needed to be adjusted. When display of the current image is completed, the target grayscale value corresponding to the pixel needed to be adjusted is transmitted into the display screen, such that the liquid crystal at the position corresponding to the target grayscale value is flipped in advance. When the next frame image needs to be displayed, all the liquid crystals may be flipped according to the pixel data in the frame cache on the basis of the pre-flipped liquid crystal, such that the next frame image of the current image may be displayed when the display screen is lit, which is not only advantageous to reducing the flipping angle and the flipping time of the liquid crystal during the switch of the images, and accelerating the flipping speed of the liquid crystal, but also is advantageous to improving the smoothness of the image display.

Figure 4:
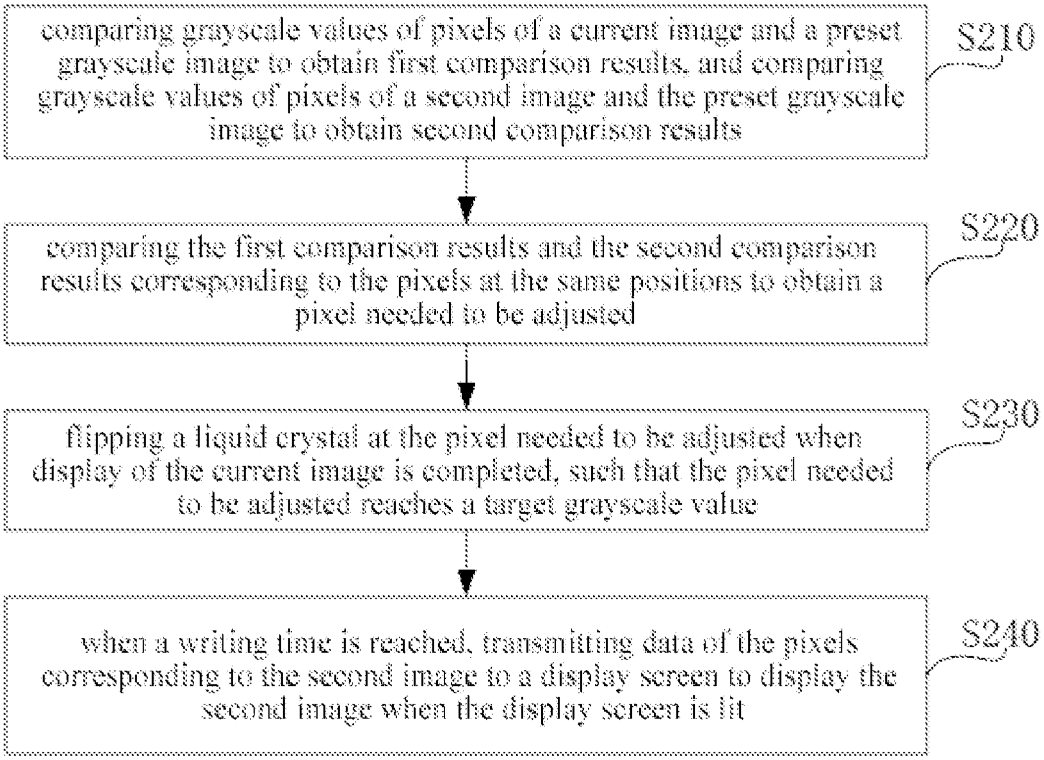
FIG. 4 is a flow diagram of a second embodiment of the image display method of the present disclosure.

As shown in FIG. 4, in the second embodiment of the present disclosure, based on the first embodiment, after step S230, the method further includes:

Step S240: when a writing time is reached, transmitting data of the pixels corresponding to the second image to a display screen to display the second image when the display screen is lit.

In the present embodiment, when display of the current image is completed, whether the writing time of the pixel data written into the second image is reached is detected after the liquid crystal at the pixel needed to be adjusted is flipped. When it is detected that the writing time of the pixel data written into the second image is reached, the pixel data of the second image is written into the third cache, and then the pixel data in the third cache is transmitted into the display screen. On the basis of the corresponding image after the liquid crystal is flipped, the liquid crystal is flipped again according to the pixel data 1 in the third cache, so as to display the second image when the backlight of the display is lit.

As shown in FIG. 3, it is assumed that except that the R component and the B component of the pixel A are different in the first image, the middle image and the second image, the G component of the pixel A and the pixel data of other pixels in the first image, the middle image and the second image are the same. After the pixel data in the third cache is transmitted into the display screen, the liquid crystals at the positions corresponding to the G component of the pixel A and the RGB component of other pixels in the middle image are not flipped, and only the liquid crystals at the positions corresponding to the R component and the B component of the pixel A in the middle image are flipped. The result after flipping is shown as c of FIG. 3. In c of the pixel A, R=128, G=150, B=130. The RGB components of the other pixels are not changed. c is displayed when the backlight of the display is lit, that is, the second image is displayed. Among them, the liquid crystals at the positions corresponding to the R component and the B component of the pixel A in the middle image is flipped, and the R component of the pixel A in the middle image is changed from 127 to 128, and the B component is changed from 127 to 130. Thus the flipping angle and the flipping time of the liquid crystal are reduced, so as to accelerate the flipping speed of the liquid crystal.

In the technical solution of the present embodiment, it is disclosed a technical solution that: when the writing time is reached, the pixel data corresponding to the next frame image of the current image is written into the frame cache, and the pixel data in the frame cache is transmitted into the display screen to flip all the liquid crystals according to the pixel data in the frame cache on the basis of the liquid crystals being flipped in advance, so as to display the next frame image of the current image when the display screen is lit. Thus, the flipping angle and the flipping time of the liquid crystal are reduced when the images are switched, the flipping speed of the liquid crystal is accelerated, and the smoothness of the image display is also improved.

Figure 5:
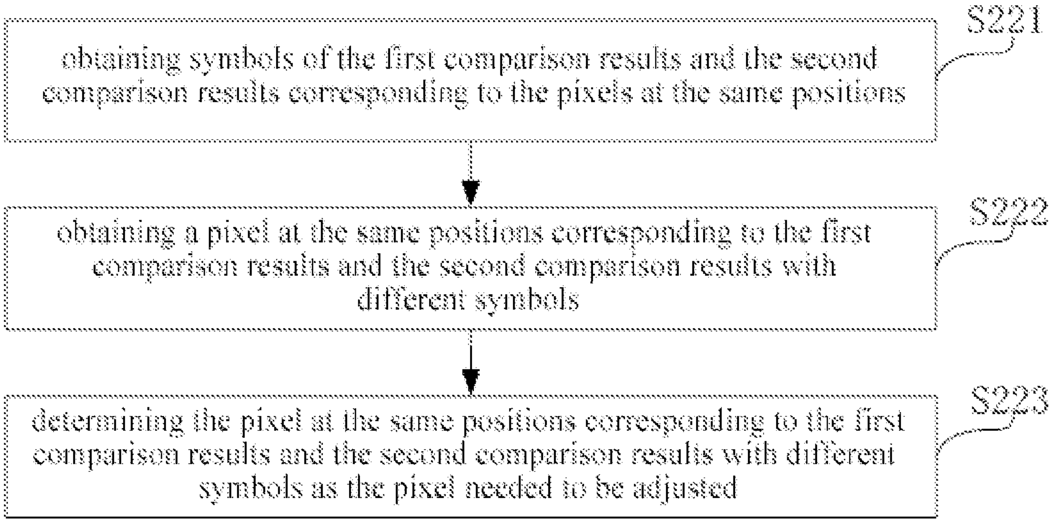
FIG. 5 is a flow diagram of a third embodiment of the image display method of the present disclosure.

As shown in FIG. 5, in a third embodiment of the present disclosure, based on the first embodiment, the step S220 also includes the following steps:

Step S221: obtaining symbols of the first comparison results and the second comparison results corresponding to the pixels at the same positions.

In the present embodiment, after obtaining the first comparison results and the second comparison results from the first cache and the second cache respectively, the symbols of the first comparison results and the second comparison results corresponding to the pixels at the same positions in the first image and the second image are obtained. For example, if the first comparison result between the pixel A in the first image and the pixel A in the preset grayscale image is (−4, 23, −17), and the second comparison result between the pixel A in the second image and the pixel A in the preset grayscale image is (1, 23, 3), the symbol of the first comparison result is (−, +, −), and the symbol of the second comparison result is (+, +, +).

Step S222: obtaining a pixel at the same positions corresponding to the first comparison results and the second comparison results with different symbols.

Step S223: determining the pixel at the same positions corresponding to the first comparison results and the second comparison results with different symbols as the pixel needed to be adjusted.

In the present embodiment, it is assumed that the symbol of the first comparison result between the pixel A in the first image and the pixel A in the preset grayscale image is (−, +, −), and the symbol of the second comparison result between the pixel A in the second image and the pixel A in the preset grayscale image is (+, +, +); the symbol of the first comparison result between the pixel B in the first image and the pixel B in the preset grayscale image is (+, +, −), and the symbol of the second comparison result between the pixel B in the second image and the pixel B in the preset grayscale image is (+, −, +); and the symbol of the first comparison result between the pixel C in the first image and the pixel C in the preset grayscale image is (+, +, +), and the symbol of the second comparison result between the pixel C in the second image and the pixel C in the preset grayscale image is (+, +, +), etc. After comparison, the symbol of the first comparison result between the pixel A in the first image and the pixel A in the preset grayscale image is different from the symbol of the second comparison result between the pixel A in the second image and the pixel A in the preset grayscale image, and the symbol of the second comparison result between the pixel B in the first image and the pixel B in the preset grayscale image is different from the symbol of the second comparison result between the pixel B in the second image and the pixel B in the preset grayscale image, and thus the pixel A and the pixel B in the first image are determined as the pixels needed to be adjusted.

Specifically, the step S220 further includes: summing up absolute values of the first comparison results and the second comparison results with different symbols to obtain an absolute difference, and if the absolute difference is greater than a preset difference, determining the corresponding pixel at the same positions as the pixel needed to be adjusted.

In the present embodiment, there may be a situation that the grayscale values of the pixels at the same positions of the first image and the second image are close to each other. For example, the grayscale value of the pixel A in the first image is (123, 125, 128), and the grayscale value of the pixel A in the second image is (125, 128, 130). For another example, the grayscale value of the pixel A in the first image is (120, 125, 128), and the grayscale value of the pixel A in the second image is (118, 121, 132), etc. In this case, although the symbol of the first comparison result between the grayscale value of the pixel A in the first image and the grayscale value of the pixel A in the preset grayscale image is different from the symbol of the second comparison result between the gray level value of the symbol of pixel A in the second image and the gray level value of the symbol of pixel A in the preset grayscale image, it is not required to flip the liquid crystal at the position of the pixel A in the first image, that is, it is not required to take the pixel A in the first image as the pixel needed to be adjusted since the grayscale value of the symbol of pixel A in the first image is close to the grayscale value of the symbol of pixel A in the second image, that is, the difference between them is not large. In this regard, when the symbol of the first comparison result between the grayscale value of pixels in the first image and the grayscale value of the pixels in the preset grayscale image is different from the symbol of the second comparison result between the grayscale value of pixels in the second image and the grayscale value of the pixels in the preset grayscale image, and the grayscale value of the pixels in the first image is significantly different from the grayscale value of the pixels in the second image, the pixels at the same positions corresponding to the first comparison result and the second comparison result with different symbols are determined as the pixels needed to be adjusted.

Specifically, in the present embodiment, a preset difference is preset to determine the large difference between the grayscale value of the pixels in the first image and the grayscale value of the pixels in the second image. After obtaining the pixels at the same positions corresponding to the first comparison result and the second comparison result with different symbols, the absolute value of the first comparison result is summed with the absolute value of the second comparison result, to obtain the absolute difference. If the absolute difference is greater than the preset difference, it is determined that the pixels at the same positions corresponding to the first comparison result and the second comparison result with different symbols are the pixels needed to be adjusted. If the absolute difference is less than or equal to the preset difference, the pixels at the same positions corresponding to the first comparison result and the second comparison result with different symbols are not used as the pixels needed to be adjusted.

For example, the preset difference is (15, 15, 15), and the first comparison result and the second comparison result with different symbols corresponding to the pixel A at the same positions respectively are as follows: the first comparison result is (−4, 23, −17), and the second comparison result is (1, 23, 3). After summing up the absolute value of the first comparison result with the absolute value of the second comparison result, the obtained absolute difference is (5, 46, 20), wherein, 5<15, 46>15 and 20>15, That is, the liquid crystals at the positions corresponding to the R component in the pixel A are not flipped, and the liquid crystals at the positions corresponding to the G component and the B component in the pixel A are needed to be flipped.

Further, based on the third embodiment, after the step S223 the method further includes:

Adjusting the first comparison result corresponding to the pixel needed to be adjusted in the first cache to the first preset value, and adjusting the first comparison result corresponding to the pixel that does not need to be adjusted in the first cache to the second preset value.

In the present embodiment, after obtaining the pixel needed to be adjusted, the first comparison result corresponding to the pixel needed to be adjusted in the first cache is adjusted to the first preset value, for example, the first preset value is set to 1. Similarly, the first comparison result corresponding to the pixels that do not needed to be adjusted in the first cache is adjusted to the second default value, for example, the second default value is set to 0. Here, the pixels that do not need to be adjusted are the pixels at the same positions corresponding to the first comparison result and the second comparison result with the same symbols.

Referring to the example in the third embodiment, the pixel A and the pixel B in the first image are pixels needed to be adjusted, and thus the first comparison result between the pixel A in the first image and the pixel A in the preset grayscale image is set to (1, 0, 1), and the first comparison result between the pixel B in the first image and the pixel B in the preset grayscale image is set to (0, 1, 1).

Based on this, the step S220 further includes determining the pixel in which the first comparison result in the first cache is the first preset value as the pixel needed to be adjusted.

Continuing with the above example, the first comparison results in the first cache include (1, 0, 1) and (0, 1, 1). Thus, according to (1, 0, 1) and (0, 1, 1), it may be determined that the liquid crystal at the positions corresponding to the R and B components of the RGB component of the pixel A are needed to be flipped, and the liquid crystals at the positions corresponding to the G and B components of the RGB component of the pixel B are needed to be flipped. Then, R=127 and B=127 of the RGB component of the pixel A and G=127 and B=127 of the RGB component of the pixel B are transmitted into the display screen. Then, on the basis of the R and B components of the pixel A and the G and B components of the RGB components of the pixel B in the first image, the liquid crystals at the positions corresponding to the R and B components in the RGB components of the pixel A and the G and B components in the RGB components of the pixel B are flipped according to the target grayscale value. Here, R=127 and B=127 in the RGB component of the pixel A and B=127 in the RGB component of the pixel B are target grayscale values.

In the present embodiment, according to the above technical solution that the first comparison result corresponding to the pixels needed to be adjusted in the first cache is adjusted as the first preset value and the first comparison result corresponding to the pixels that do not needed to be adjusted in the first cache is adjusted as the second preset value, marking of the pixels needed to be adjusted and the pixels that do not needed to be adjusted is achieved, which is advantageous to quickly obtaining the pixels needed to be adjusted from the first comparison results in the first cache according to the mark. Thus, the time to determine the pixels needed to be adjusted is reduced, which is advantageous to reduce the flipping time of the liquid crystal.

Figure 6:
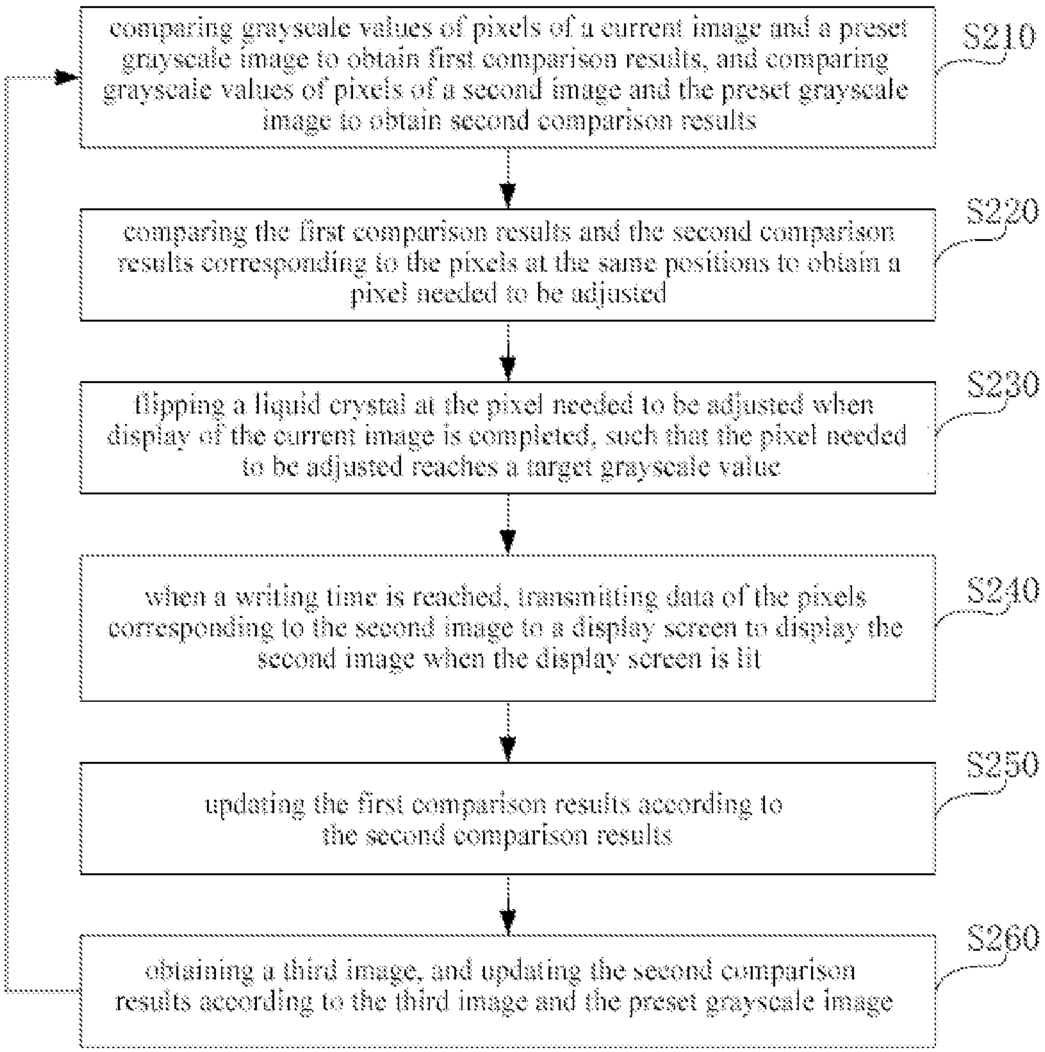
FIG. 6 is a flow diagram of a fourth embodiment of the image display method of the present disclosure.

As shown in FIG. 6, in the fourth embodiment of the present disclosure, based on the second embodiment, the image display method of the present disclosure also includes the following steps:

Step S210: comparing grayscale values of pixels of a current image and a preset grayscale image to obtain first comparison results, and comparing grayscale values of pixels of a second image and the preset grayscale image to obtain second comparison results.

Step S220: comparing the first comparison results and the second comparison results corresponding to the pixels at the same positions to obtain a pixel needed to be adjusted.

Step S230: flipping a liquid crystal at the pixel needed to be adjusted when display of the current image is completed, such that the pixel needed to be adjusted reaches a target grayscale value.

Step S240: when a writing time is reached, transmitting data of the pixels corresponding to the second image to a display screen to display the second image when the display screen is lit.

Step S250: updating the first comparison results according to the second comparison result.

Step S260: obtaining a third image, and updating the second comparison results according to the third image and the preset grayscale image, and then returning to the step S210.

In the present embodiment, the specific embodiments of steps S210-S240 are referred to the first and second embodiments. After performing the step S240, the next frame image of the second image continues to be displayed, and the next frame image of the second image is represented as the third image. When the next frame image of the second image needs to be displayed, the first comparison result in the first cache will not be used, that is, the first comparison result will occupy the storage space of the first cache. Thus, when the second image is displayed, the second comparison result in the second cache is used to update the first comparison result in the first cache. Specifically, updating the first comparison result in the first cache with the second comparison result in the second cache means releasing the first cache, that is, clearing the first comparison result in the first cache and then writing the second comparison result into the first cache. At this time, the first cache will no longer store the first comparison result, and the second comparison result is stored in both the first cache and the second cache.

When the second image is displayed, the third image is obtained, and the second comparison result is updated according to the third image and the preset grayscale image. Specifically, after obtaining the third image, the difference of the gray level values of the pixels between the third image and the preset grayscale image are calculated, so as to obtain the third comparison results. For example, the RGB component of one pixel A in the third image is (227, 100, 135), and the RGB component of the pixel A in the preset grayscale image is also (127, 127, 127). Thus, the difference between the RGB component of the pixel A in the third image and the RGB component of the pixel A in the preset grayscale image is (100, 127, 127), that is, the third comparison result is (100, −27, 8).

Further, the second comparison result in the second cache is updated with the third comparison result. Updating the second comparison result in the second cache with the third comparison result means releasing the second cache, that is, clearing the second comparison result in the second cache, and then writing the third comparison result into the second cache. At this time, the second cache will no longer store the second comparison result, and finally the first cache stores the second comparison result and the second cache stores the third comparison result. After that, it is returned to perform the step S210, and the steps are performed in a loop.

According to the above technical solutions, the present embodiment reduces the occupation of the cache space and improves the utilization rate of the space of the cache.

Figure 7:
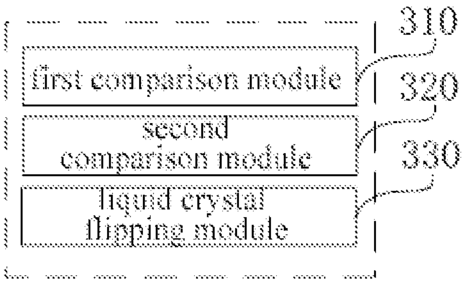
FIG. 7 is a functional module diagram of an image display system of the present disclosure.

Further, as shown in FIG. 7, the present disclosure also provides an image display system based on the same invention idea, the image display system includes:

A first comparison module 310 for comparing grayscale values of pixels of a current image and a preset grayscale image to obtain first comparison results, and comparing grayscale values of pixels of a second image and the preset grayscale image to obtain second comparison results, wherein the second image is a next frame image of the current image A second comparison module 320 for comparing first comparison results and the second comparison results corresponding to the pixels at the same positions to obtain a pixel needed to be adjusted; and A liquid crystal flipping module 330 for flipping a liquid crystal at the pixel needed to be adjusted when display of the current image is completed, such that the pixel needed to be adjusted reaches a target grayscale value.

The specific embodiments of the image display system of the present disclosure are basically the same as the embodiments of the above image display method, and they can achieve the same technical effects, which will not be repeated here.

Further, based on the of the same invention idea, the present disclosure also provides a display device, which includes a memory, a processor and an image display program stored on the memory and operable on the processor, wherein when the image display program is executed by the processor, steps of the above image display method are achieved.

The specific embodiments of the display device of the present disclosure are basically the same as the embodiments of the above image display method, and they can achieve the same technical effects, which will not be repeated here.

Further, based on the same invention idea, the present disclosure also provides a head-mounted display device, which includes the image display system or the display device.

The specific embodiments of the head-mounted display device of the present disclosure are basically the same as the above embodiments of the image display method, and they can achieve the same technical effects, which will not be repeated here.

Further, based on the same invention idea, the present disclosure also provides a storage medium in which an image display program is stored, wherein when the image display program is executed by a processor, steps of the above image display method are achieved. The specific embodiments of the storage medium of the present disclosure are basically the same as the embodiments of the above image display method, and they can achieve the same technical effects, which will not be repeated here.

Since the storage medium provided by the embodiment of the present disclosure is the storage medium used to implement the method of the embodiment of the present disclosure, therefore, based on the method disclosed in the embodiment of the present disclosure, those of ordinary skill in the art may understand the specific structure and deformation of the storage medium, so it will not be repeated here. All the storage media used in the method of the embodiment of the present disclosure fall within the scope intended to be protected in the present disclosure.

Those of ordinary skill in the art should understand that the embodiments of the present disclosure may be provided as methods, systems or computer program products. Therefore, the present disclosure may take the forms of an embodiment of hardware totally, an embodiment of software totally or an embodiment of a combination of software and hardware.

Furthermore, the present disclosure may take the form of a computer program product implemented on one or more computer available storage medium (including but not limited to disk memory, CD-ROM, optical memory, etc.) which contain computer readable program codes.

The present disclosure is described by reference to flow chart and/or block diagram of methods, devices (systems) and computer program products according to the embodiments of the present disclosure. It should be understood that each process and/or block in the flowchart and/or block diagram and a combination of processes and/or blocks in the flowchart and/or the block diagram may be implemented by a computer program instruction. These computer program instructions may be supplied to a general-purpose computer, a special purpose computer, an embedded processor or a processor of other programmable data processing devices to produce a machine, such that a device for implement the functions specified in one or more process of the flowchart and/or one or more blocks in the block diagram are generated by the instructions executed by the computer or the processor of other programmable data processing devices.

These computer program instructions may also be stored in the computer-readable memory capable of directing a computer or other programmable data processing devices to work in a particular manner, such that the instructions stored in the computer-readable memory produce manufactured goods including instruction devices, the instruction device implements the function specified in one or more processes of the flowchart and/or one or more blocks in the block diagram.

These computer program instructions may also be loaded onto the computer or other programmable data processing devices, such that a series of operational steps are performed on the computer or other programmable data processing devices to produce the process implemented by the computer, thus instructions executed on the computer or other programmable devices provide steps for implementing functions specified in one or more processes of the flowchart and/or one or more blocks in the block diagram.

Embodiments in this specification are described in a parallel or progressive manner, and each embodiment focuses on the differences from other embodiments. The same or similar parts of each embodiment can be referred to each other. For the device disclosed by the embodiment, as it corresponds to the method disclosed by the embodiment, the description is relatively simple, and the relevant points can be described in the part about the method.

It may also be understood by those of ordinary skill in the art that the units and algorithmic steps of each example described in combination with the embodiments disclosed herein may be implemented in electronic hardware, computer software or a combination of both. In order to clearly illustrate the interchangeability of hardware and software, the composition and steps of each example have been described generally in terms of function in the above description. Whether these functions are performed in hardware or software depends on the specific application and design constraints of the technical solution. Technical professionals may use different methods s for each particular application to achieve the described function, but such implementation should not be considered as going beyond the scope of the present disclosure.

The steps of the methods or algorithms described in combination with the embodiments disclosed herein may be implemented directly with hardware, software modules executed by processors or a combination of both. Software modules may be placed in random access memory (RAM), memory, read-only memory (ROM), electrically programmable ROM, electrically erasable programmable ROM, registers, hard disks, removable disks, CD-ROMs, or any other form of storage medium known in the technical field.

It should also be noted that in this text, relational terms such as first and second are used only to distinguish one entity or operation from another, and do not necessarily require or imply any such actual relationship or order is existed between these entities or operations. Furthermore, the term "comprise", "include" or any other variation thereof is intended to cover non-exclusive inclusion, so that a process, method, article or equipment including a set of elements includes not only those elements but also other elements not expressly listed, or elements inherent to such process, method, article or equipment. In the absence of further restrictions, the element defined by the sentence "including a . . . " does not exclude the existence of additional identical elements in a process, method, article or device including the element.

What is claimed is:

1. An image display method, applied to a display device, wherein the image display method comprises:

comparing grayscale values of pixels of a current image and a preset grayscale image to obtain first comparison results, and comparing grayscale values of pixels of a second image and the preset grayscale image to obtain second comparison results, wherein the second image is a next frame image of the current image;

comparing the first comparison results and the second comparison results corresponding to the pixels at the same positions to obtain a pixel needed to be adjusted; and flipping a liquid crystal at the pixel needed to be adjusted when display of the current image is completed, such that the pixel needed to be adjusted reaches a target grayscale value.

2. The image display method of claim 1, wherein the first comparison results are differences between the grayscale values of the pixels of the current image and the preset grayscale image, and the second comparison results are differences between the grayscale values of the pixels of the second image and the preset grayscale image, and wherein comparing the first comparison results and the second comparison results corresponding to the pixels at the same positions to obtain the pixel needed to be adjusted comprises:

obtaining symbols of the first comparison results and the second comparison results corresponding to the pixels at the same positions;

obtaining a pixel at the same positions corresponding to the first comparison results and the second comparison results with different symbols; and determining the pixel at the same positions corresponding to the first comparison results and the second comparison results with different symbols as the pixel needed to be adjusted.

3. The image display method of claim 2, wherein comparing the first comparison results and the second comparison results corresponding to the pixels at the same positions to obtain the pixel needed to be adjusted further comprises:

summing up absolute values of the first comparison results and the second comparison results with different symbols to obtain an absolute difference, and if the absolute difference is greater than a preset difference, determining the corresponding pixel at the same positions as the pixel needed to be adjusted.

4. The image display method of claim 1, wherein the target grayscale values is the same as the grayscale value of the preset grayscale image.

5. The image display method of claim 4, wherein the image display method, after flipping the liquid crystal at the pixel needed to be adjusted when display of the current image is completed, such that the pixel needed to be adjusted reaches the target grayscale value, further comprises:

when a writing time is reached, transmitting data of the pixels corresponding to the second image to a display screen to display the second image when the display screen is lit.

6. The image display method of claim 5, wherein the image display method, after when the writing time is reached, transmitting the data of the pixels corresponding to the second image to the display screen to display the second image when the display screen is lit, further comprises:

updating the first comparison results according to the second comparison results;

obtaining a third image, and updating the second comparison results according to the third image and the preset grayscale image, wherein the third image is a next frame image of the second image; and returning to perform comparing the grayscale values of the pixels of the current image and the preset grayscale image to obtain the first comparison results and comparing the grayscale values of the pixels of the second image and the preset grayscale image to obtain the second comparison results.

7. An image display system comprising:

a first comparison module for comparing grayscale values of pixels of a current image and a preset grayscale image to obtain first comparison results, and comparing grayscale values of pixels of a second image and the preset grayscale image to obtain second comparison results, wherein the second image is a next frame image of the current image;

a second comparison module for comparing first comparison results and the second comparison results corresponding to the pixels at the same positions to obtain a pixel needed to be adjusted; and a liquid crystal flipping module for flipping a liquid crystal at the pixel needed to be adjusted when display of the current image is completed, such that the pixel needed to be adjusted reaches a target grayscale value.

8. A display device comprising a memory, a processor and an image display program stored on the memory and operable on the processor, wherein when the image display program is executed by the processor, steps of the image display method of claim 1 are implemented.

9. A head-mounted display device comprising the image display system of claim 7.

10. A non-transitory storage medium on which an image display program is stored, wherein when the image display program is executed by a processor, steps of the image display method of claim 1 are implemented.

11. A head-mounted display device comprising the display device of claim 8.

* * * * *